(12) United States Patent
Huang et al.

(10) Patent No.: US 8,297,827 B2
(45) Date of Patent: Oct. 30, 2012

(54) BACKLIGHT MODULE

(75) Inventors: Ming-Feng Huang, Hsinchu (TW); Yi-Wen Lin, Hsinchu (TW); Hung-Chih Lin, Hsinchu (TW)

(73) Assignee: Young Lighting Technology, Inc., Hsin-Chu (TW)

( * ) Notice: Subject to any disclaimer, the term of this patent is extended or adjusted under 35 U.S.C. 154(b) by 0 days.

(21) Appl. No.: 12/985,953

(22) Filed: Jan. 6, 2011

(65) Prior Publication Data

US 2011/0211366 A1 Sep. 1, 2011

(30) Foreign Application Priority Data

Feb. 26, 2010 (TW) ................................ 99105654 A

(51) Int. Cl.
 *F21V 7/04* (2006.01)
(52) U.S. Cl. ....... 362/612; 362/97.1; 362/613; 362/632; 362/600
(58) Field of Classification Search ........ 362/97.1–97.4, 362/600, 601, 606, 611–613, 632, 634, 607, 362/608, 615, 621
See application file for complete search history.

(56) References Cited

U.S. PATENT DOCUMENTS

| | | | |
|---|---|---|---|
| 6,443,583 B1 * | 9/2002 | Ha | 362/608 |
| 7,036,946 B1 * | 5/2006 | Mosier | 362/27 |
| 7,545,461 B2 | 6/2009 | Kondo et al. | |
| 2002/0012243 A1 * | 1/2002 | Matsushita | 362/31 |
| 2002/0018341 A1 * | 2/2002 | Torihara et al. | 362/31 |
| 2002/0030982 A1 * | 3/2002 | Ha | 362/31 |
| 2006/0056198 A1 * | 3/2006 | Choi et al. | 362/601 |
| 2007/0279944 A1 * | 12/2007 | Sakai | 362/633 |
| 2010/0073959 A1 * | 3/2010 | Hamada | 362/611 |

FOREIGN PATENT DOCUMENTS

| | | |
|---|---|---|
| TW | I248538 | 2/2006 |
| TW | M307133 | 3/2007 |
| TW | 200823568 A | 6/2008 |

\* cited by examiner

*Primary Examiner* — Danielle Allen
(74) *Attorney, Agent, or Firm* — Muncy, Geissler, Olds & Lowe, PLLC

(57) ABSTRACT

A backlight module includes a light guide plate having a light incident surface, a light source module, at least one catch member, and a cushion member. The light source module is disposed adjacent to the light incident surface and has at least one light-emitting element, wherein a light beam emitted by the light-emitting element is capable of entering the light guide plate through the light incident surface. The catch member engages with one end of the light source module, wherein the catch member has at least one extension part extending towards the light incident surface of the light guide plate, and the extension part has an end surface facing the light incident surface. The cushion member is disposed between the light guide plate and the light source module and is adjacent to the light incident surface of the light guide plate and the end surface of the catch member.

10 Claims, 4 Drawing Sheets

BACKLIGHT MODULE

BACKGROUND OF THE INVENTION a. Field of the Invention

The invention relates to a backlight module.

b. Description of the Related Art

FIG. 6 shows a schematic cross-section of a conventional backlight module. Referring to FIG. 6, a light-emitting element 102 of a backlight module 100 is screwed on a metal plate 104, and the metal plate 104 is connected with a back plate 106. A light guide plate 108 is disposed adjacent to the light-emitting element 102. A reflective sheet 110 is disposed on the bottom side of the light guide plate 108, and a plurality of optical films 112 are disposed on the top side of the light guide plate 108. In a typical design of a backlight module 100, the distance between the light-emitting element 102 and the light guide plate 108 should be as little as possible to improve light-emitting efficiency and reduce light loss. Further, the light guide plate 108 is liable to expand and deform due to the high-temperature generated by the light-emitting element 102 or high-humidity ambiance. As the distance between the light-emitting element 102 and the light guide plate 108 becomes shorter, the deformed light guide plate 108 may hit or squeeze the light-emitting element 102 to damage or peel the light-emitting element 102.

BRIEF SUMMARY OF THE INVENTION

The invention provides a backlight module, wherein a light-emitting element is prevented from being damaged or peeled off upon suffering hits or squeezes given by a light guide plate. Other objects and advantages of the invention may be further illustrated by the technical features broadly embodied and described as follows.

In order to achieve one or a portion of or all of the objects or other objects, one embodiment of the invention provides a backlight module. The backlight module includes a light guide plate having a light incident surface, a light source module, at least one catch member, and a cushion member. The light source module is disposed adjacent to the light incident surface and has at least one light-emitting element, wherein a light beam emitted by the light-emitting element is capable of entering the light guide plate through the light incident surface. The catch member engages with one end of the light source module, wherein the catch member has at least one extension part extending towards the light incident surface of the light guide plate, and the extension part has an end surface facing the light incident surface. The cushion member is disposed between the light guide plate and the light source module and is adjacent to the light incident surface of the light guide plate and the end surface of the catch member.

According to another embodiment of the invention, a backlight module includes a light guide plate having a light incident surface, a light source module, a first catch member, a second catch member, a cushion member, and at least one fastening member. The light source module is disposed adjacent to the light incident surface and has at least one light-emitting element, wherein a light beam emitted by the light-emitting element is capable of entering the light guide plate through the light incident surface. The first catch member engages with a first end of the light source module, wherein the first catch member has an extension part extending towards the light incident surface of the light guide plate, and the extension part of the first catch member has an end surface facing the light incident surface. A second catch member presses against a second end of the light source module. A cushion member is disposed between the light guide plate and the light source module and touches at least the light incident surface of the light guide plate, the end surface of the first catch member, and the end surface of the second catch member. The fastening member is capable of fastening the first catch member, the second catch member, and the light source module together.

In one embodiment, the fastening member is a screw, and the screw secures the first catch member, the second catch member, and the light source module to a back plate.

In one embodiment, the light source module is a light emitting diode (LED) light bar, and the cushion member includes an elastic material.

In summary, the embodiment or the embodiments of the invention may have at least one of the following advantages. Since at least one catch member may engage with the light source module, and a cushion member between the light guide plate and the light source module is disposed adjacent to one end of the light guide plate and one end of the catch member, the cushion member is allowed to absorb the stress caused by thermal expansion on the light guide plate, so as to prevent the light-emitting element from being damaged or peeled off.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
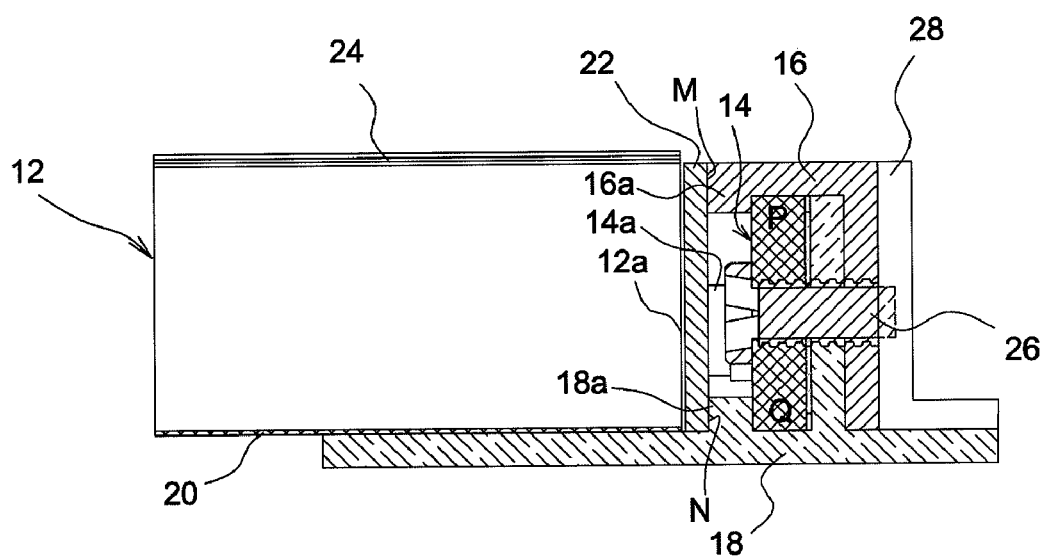
FIG. 1 shows a schematic cross-section of a backlight module according to an embodiment of the invention.

Referring to FIG. 1, the backlight module 10 includes a light guide plate 12, a light source module 14, an upper catch member 16, a lower catch member 18, and a cushion member 22. The light guide plate 12 has a light incident surface 12a, and the light source module 14 is disposed adjacent to the light incident surface 12a and has at least one light-emitting element 14a. A light beam emitted by the light-emitting element 14a is capable of entering the light guide plate 12 through the light incident surface 12a. A reflective sheet 20 is disposed on the bottom side of the light guide plate 12, and a plurality of optical films 24 are disposed on the top side of the light guide plate 12. The upper catch member 16 engages with a first end P of the light source module 14. The upper catch member 16 has an extension part 16a extending towards the light incident surface 12a of the light guide plate 12, and the extension part 16a has an end surface M being disposed beside and facing the light incident surface 12a. The lower catch member 18 engages with a second end Q of the light source module 14. The lower catch member 18 has an extension part 18a extending towards the light incident surface 12a of the light guide plate 12, and the extension part 18a has an end surface N being disposed beside and facing the light incident surface 12a. The cushion member 22 is disposed between the light guide plate 12 and the light source module 14. More specifically, the cushion member 22 may be disposed between the extension part 16a of the upper catch member 16 and the light incident surface 12a and between the extension part 18a of the lower catch member 18 and the light incident surface 12a. In one embodiment, the cushion member 22 may be adjacent to or may touch the light incident surface 12a of the light guide plate 12, the end surface M of the upper catch member 16, and the end surface N of the lower catch member 18. Therefore, the end surface M of the extension part 16a of the upper catch member 16 and the end surface N of the extension part 18a of the lower catch member 18 are disposed against the light incident surface 12a of the light guide plate 12 through the cushion member 22. Further, in this embodiment, at least one screw 26 fastens the upper catch member 16, the lower catch member 18, and the light source module 14 together. Besides, one end of the screw 26 is secured to a back plate 28.

Since the light source module 14 may produce considerable heat during operation, the heated light guide plate 12 expands to hit or squeeze the light-emitting element 14a to result in short-circuiting or physical damages on the light-emitting element 14a. Hence, according to the above embodiment, at least one catch member engages with the light source module 14, and a cushion member 22 between the light guide plate 12 and the light source module 14 is disposed adjacent to one end of the light guide plate 12 and ends of the catch members 16 and 18, so the cushion member 22 is allowed to absorb the stress on light guide plate 12 due to thermal expansion, so as to prevent the light-emitting element 14a from being damaged or peeled off.

In one embodiment, the cushion member 22 may include an elastic material capable of absorbing an external force applied thereon. For example, the elastic material may be a silica gel. The light source module 14 may be an LED light bar, and the light-emitting element 14a may be an LED.

Figure 2:
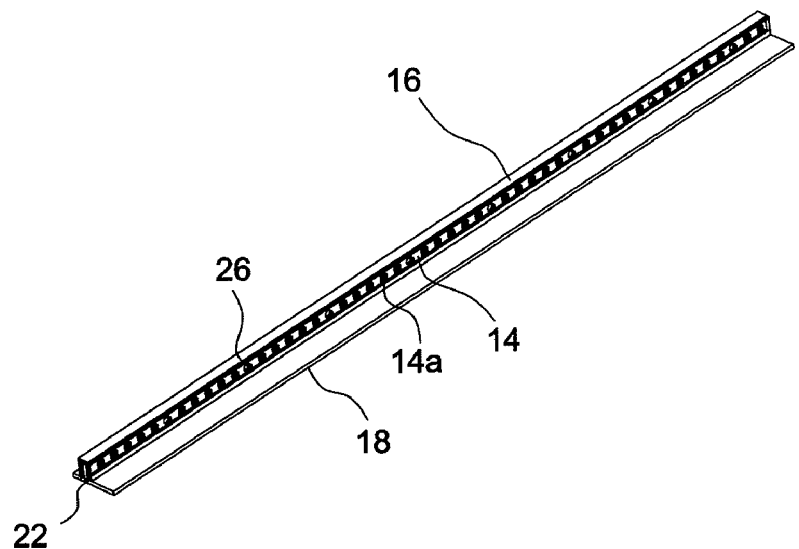
FIG. 2 shows a three-dimensional diagram illustrating the coupling between a catch member, a cushion member, and a light source module.

Referring to FIG. 2, in one embodiment, two ends of the light source module 14 respectively engage with the upper catch member 16 and the lower catch member 18, and the screw 26 fastens the upper catch member 16, the lower catch member 18, and the light source module 14 together.

Figure 3:
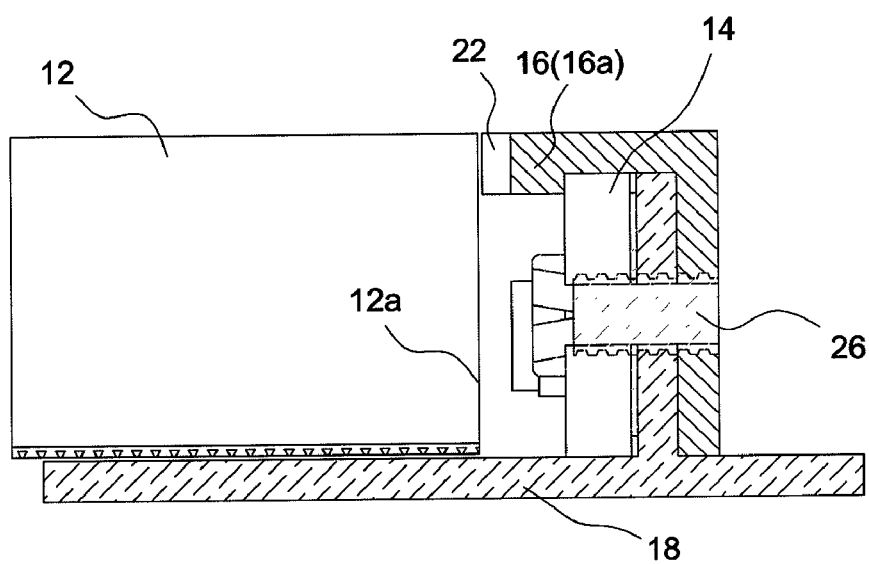
FIG. 3 shows a schematic cross-section of a backlight module according to another embodiment of the invention.
Figure 4:
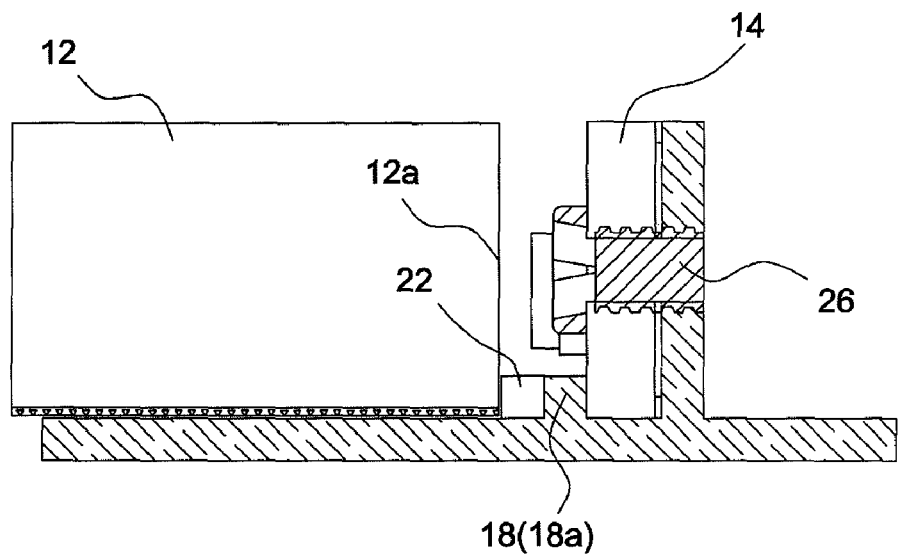
FIG. 4 shows a schematic cross-section of a backlight module according to another embodiment of the invention.
Figure 5:
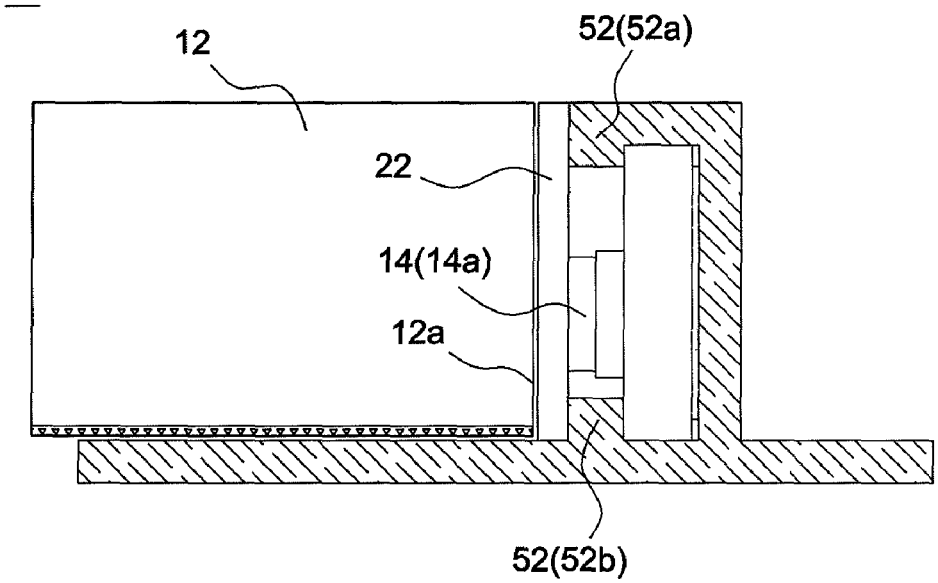
FIG. 5 shows a schematic cross-section of a backlight module according to another embodiment of the invention.
Figure 6:
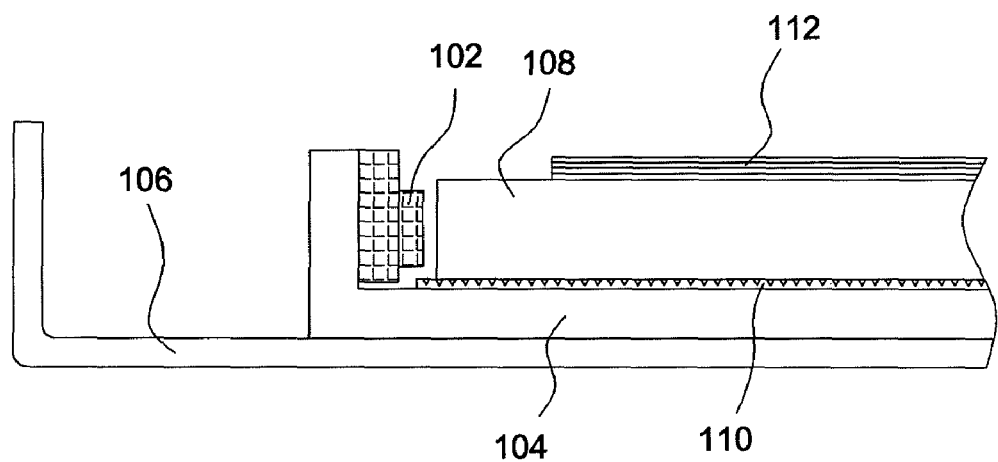
FIG. 6 shows a schematic cross-section of a conventional backlight module.

Referring to the backlight module 30 shown in FIG. 3, the lower catch member 18 presses against the light source module 14 and does not have the extension part 18a extending towards the light incident surface 12a, and the cushion member 22 is disposed only between the extension part 16a of the upper catch member 16 and the light guide plate 12. The screw 26 fastens the upper catch member 16, the lower catch member 18, and the light source module 14 together. Further, in an alternate embodiment shown in FIG. 4, the backlight module 40 may only have the lower catch member 18 but does not have the upper catch member 16. The lower catch member 18 presses against the light source module 14 and has the extension part 18a extending towards the light incident surface 12a, and the cushion member 22 is disposed only between the extension part 18a of the lower catch member 18 and the light guide plate 12. The screw 26 fastens the lower catch member 18 and the light source module 14 together. Besides, as shown in FIG. 5, the light source module 14 of a backlight module 50 slidably engages with a one-piece catch member 52, and the light-emitting element 14a is fixed on the light source module 14 by a double-side tape or thermal grease. Hence, the screw 26 may not be needed. The catch member 52 has an upper extension part 52a and a lower extension part 52b, and the cushion member 22 is disposed between the upper extension part 52a and the light guide plate 12 and between the lower extension part 52b and the light guide plate 12.

In summary, the embodiment or the embodiments of the invention may have at least one of the following advantages. Since at least one catch member may engage with the light source module, and a cushion member between the light guide plate and the light source module is disposed adjacent to one end of the light guide plate and one end of the catch member, the cushion member is allowed to absorb the stress caused by thermal expansion on the light guide plate, so as to prevent the light-emitting element from being damaged or peeled off.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A backlight module, comprising:
    a light guide plate having a light incident surface;
    a light source module disposed adjacent to the light incident surface and having at least one light-emitting element, wherein a light beam emitted by the light-emitting element is capable of entering the light guide plate through the light incident surface;
    at least one catch member engaging with one end of the light source module, wherein the catch member has at least one extension part extending towards the light incident surface of the light guide plate, and the extension part has an end surface being disposed beside and facing the light incident surface; and
    a cushion member disposed between the light incident surface of the light guide plate and the light source module, wherein the cushion member touches the end surface of the extension part of the catch member and is between the end surface of the extension part of the catch member and the light incident surface of the light guide plate, so that the end surface of the extension part of the catch member is capable of being against the light incident surface of the light guide plate through the cushion member.

2. The backlight module as claimed in claim 1, further comprising:
    at least one fastening member capable of securing the light source module and the catch member to a back plate.

3. The backlight module as claimed in claim 2, wherein the fastening member is a screw.

4. The backlight module as claimed in claim 1, wherein the light source module is a light emitting diode light bar.

5. The backlight module as claimed in claim 1, wherein the cushion member comprises an elastic material.

6. A backlight module, comprising:
    a light guide plate having a light incident surface;
    a light source module disposed adjacent to the light incident surface and having at least one light-emitting element, wherein a light beam emitted by the light-emitting element is capable of entering the light guide plate through the light incident surface;
    a first catch member engaging with a first end of the light source module, wherein the first catch member has an extension part extending towards the light incident surface of the light guide plate, and the extension part of the first catch member has an end surface being disposed beside and facing the light incident surface;
    a second catch member pressing against a second end of the light source module, wherein the second catch member has an extension part extending towards the light incident surface of the light guide plate, and the extension part of the second catch member has an end surface being disposed beside and facing the light incident surface;
    a cushion member disposed between the light incident surface of the light guide plate and the light source module and touching the end surface of the extension part of the first catch member and the end surface of the extension part of the second catch member, wherein the cushion member is between the end surface of the extension part of the first catch member and the light incident surface and between the end surface of the extension part of the second catch member and the light incident surface, so that the end surface of the extension part of the first catch member and the end surface of the extension part of the second catch member are capable of being against the light incident surface of the light guide plate through the cushion member; and
    at least one fastening member capable of fastening the first catch member, the second catch member, and the light source module together.

7. The backlight module as claimed in claim 6, wherein the second catch member engages with the second end of the light source module.

8. The backlight module as claimed in claim 6, wherein the fastening member is a screw, and the screw secures the first catch member, the second catch member, and the light source module to a back plate.

9. The backlight module as claimed in claim 6, wherein the light source module is a light emitting diode light bar.

10. The backlight module as claimed in claim 6, wherein the cushion member comprises an elastic material.

* * * * *